US011225432B2

(12) United States Patent
Duman et al.

(10) Patent No.: US 11,225,432 B2
(45) Date of Patent: Jan. 18, 2022

(54) FOREHEARTH FRITS, PEARLS AND/OR CONCENTRATES FOR FLUORESCENCE

(71) Applicant: Ferro Corporation, Mayfield Heights, OH (US)

(72) Inventors: Yasin Musa Mehmet Duman, Cousances-les-Forges (FR); Stéphane François Yves Bodin, Saint Aignan sur Cher (FR); Benoit Darbouret, Éclaron-Braucourt-Sainte-Livière (FR)

(73) Assignee: Ferro Corporation, Mayfield Heights, OH (US)

( * ) Notice: Subject to any disclaimer, the term of this patent is extended or adjusted under 35 U.S.C. 154(b) by 660 days.

(21) Appl. No.: 15/578,789

(22) PCT Filed: Aug. 2, 2016

(86) PCT No.: PCT/US2016/045075
§ 371 (c)(1),
(2) Date: Dec. 1, 2017

(87) PCT Pub. No.: WO2017/044202
PCT Pub. Date: Mar. 16, 2017

(65) Prior Publication Data
US 2018/0179101 A1 Jun. 28, 2018

Related U.S. Application Data

(60) Provisional application No. 62/216,505, filed on Sep. 10, 2015.

(51) Int. Cl.
*C03C 4/12* (2006.01)
*C03C 3/095* (2006.01)
(Continued)

(52) U.S. Cl.
CPC ............ *C03C 4/12* (2013.01); *C03B 5/173* (2013.01); *C03B 7/02* (2013.01); *C03C 3/087* (2013.01);
(Continued)

(58) Field of Classification Search
CPC ......... C03C 3/095; C03C 3/062; C03C 3/064; C03C 3/087; C03C 4/00; C03C 4/12;
(Continued)

(56) References Cited

U.S. PATENT DOCUMENTS 3,024,120 A 3/1962 Babcock
3,024,121 A 3/1962 Hagedorn
(Continued)

FOREIGN PATENT DOCUMENTS

CN 101144016 A 3/2008
CN 103131216 A 6/2013
(Continued)

OTHER PUBLICATIONS

International Search Report for corresponding PCT/US2016/045075 dated Nov. 17, 2016, two pages.
(Continued)

*Primary Examiner* — Matthew E. Hoban
*Assistant Examiner* — Lynne Edmondson
(74) *Attorney, Agent, or Firm* — Rankin, Hill & Clark LLP; Christopher Jan Korff

(57) ABSTRACT

The present invention relates to the field of forehearth frits, pearls, and/or concentrates for use in glass compositions. In particular, the present invention provides a system of forehearth frits, pearls, and/or concentrates that is capable of parting a fluorescent effect to a glass composition by adding a fluorescent glass fit, pearl or concentrate in the forehearth
(Continued)

of a glass furnace, to form fluorescent glass and a method of using the fluorescent system of forehearth frits, pearls, and/or concentrates.

14 Claims, 1 Drawing Sheet

(51) Int. Cl.
*C03C 3/064* (2006.01)
*C03C 8/14* (2006.01)
*C09K 11/77* (2006.01)
*C03B 7/02* (2006.01)
*C03C 3/087* (2006.01)
*C03C 8/02* (2006.01)
*C09K 11/88* (2006.01)
*C03C 3/091* (2006.01)
*C03B 5/173* (2006.01)
*C03C 4/00* (2006.01)

(52) U.S. Cl.
CPC ............. *C03C 3/091* (2013.01); *C03C 3/095* (2013.01); *C03C 4/005* (2013.01); *C03C 8/02* (2013.01); *C03C 8/14* (2013.01); *C09K 11/778* (2013.01); *C09K 11/7712* (2013.01); *C09K 11/7726* (2013.01); *C09K 11/7764* (2013.01); *C09K 11/7782* (2013.01); *C09K 11/7798* (2013.01); *C09K 11/888* (2013.01); *C03C 2204/00* (2013.01); *C03C 2205/00* (2013.01)

(58) Field of Classification Search
CPC .. C03C 4/005; C03C 8/22; C03C 8/14; C03C 8/02; C03C 2204/00; C09K 11/7712; C09K 11/7726; C09K 11/7764; C09K 11/778; C03B 5/173; C03B 7/02; H01L 33/502
See application file for complete search history.

(56) References Cited

U.S. PATENT DOCUMENTS

| | | | |
|---|---|---|---|
| 3,364,041 A | 1/1968 | Swain, Jr. et al. | |
| 3,513,003 A | 5/1970 | Hammer | |
| 3,522,190 A | 7/1970 | Turner et al. | |
| 3,663,245 A | 5/1972 | Bryson | |
| 3,928,050 A | 12/1975 | Jasinski | |
| 3,996,627 A | 12/1976 | Deeg et al. | |
| 4,102,805 A | 7/1978 | Mizzoni et al. | |
| 5,256,602 A | 10/1993 | Danielson et al. | |
| 5,393,714 A | 2/1995 | Thometzek et al. | |
| 5,491,115 A | 2/1996 | Pfitzenmaier et al. | |
| 5,725,919 A * | 3/1998 | Roberts ............... | C03C 8/06 427/376.2 |
| 6,287,993 B1 | 9/2001 | Fu et al. | |
| 6,372,155 B1 | 4/2002 | Yamazaki et al. | |
| 6,984,597 B2 | 1/2006 | Ackerman | |
| 7,265,069 B2 | 9/2007 | Sakoske et al. | |
| 7,737,062 B2 | 6/2010 | Sakoske et al. | |
| 8,932,967 B2 | 1/2015 | Bettoli | |
| 8,946,102 B2 | 2/2015 | Axtell, III et al. | |
| 9,296,641 B2 | 3/2016 | Smith et al. | |
| 9,334,189 B2 | 5/2016 | Axtell, III et al. | |
| 2008/0090034 A1* | 4/2008 | Harrison ............... | C03C 4/02 428/32.71 |
| 2008/0103039 A1 | 5/2008 | Jones | |
| 2008/0124558 A1 | 5/2008 | Boek et al. | |
| 2012/0126172 A1 | 5/2012 | Zhou et al. | |
| 2012/0212962 A1 | 8/2012 | Yasumori et al. | |
| 2013/0239618 A1* | 9/2013 | Ishikawa ............... | C03B 7/06 65/66 |
| 2013/0337242 A1 | 12/2013 | Shiao et al. | |
| 2014/0003074 A1 | 1/2014 | Kishimoto | |
| 2014/0371116 A1* | 12/2014 | Hojaji ............... | C03B 19/109 507/269 |

FOREIGN PATENT DOCUMENTS

| | | |
|---|---|---|
| EP | 847964 B1 | 6/2001 |
| JP | 61174143 A | 8/1986 |
| JP | 2005-011745 A | 1/2005 |
| KR | 10-1479991 B1 | 1/2015 |
| SU | 1590455 A1 | 9/1990 |

OTHER PUBLICATIONS

Espacenet bibliographic data for JPS61174143 published Aug. 5, 1986, one page.
Espacenet bibliographic data for KR101479991 published Jan. 8, 2015, one page.
Chinese Office Action issued for CN Application No. 201680052360.3 dated Apr. 10, 2020.
Espacenet Bibliographic Data for CN 10313216 A, published Jun. 5, 2013, one page.
Espacenet Bibliographic Data for JP 2005-011745 A, published Jan. 13, 2005, one page.
European Office Action issued for EP 1644850.4 dated Dec. 21, 2008.
European Search Report issued for EP 1644850.4 dated Dec. 11, 2018.
Espacenet Bibliographic Data for JP1986-0174143 published Feb. 8, 1988, one page.
English Translation of Russian Office Action dated Nov. 19, 2019 for RU Application No. 2018106013, 4 pages.
Emglish Translation of Russian Request for Substantive Examination dated Jul. 8, 2019 for RU Application No. 2018106013, 5 pages.
Espacenet Bibliographic Data for CN 101144016 A, published Mar. 19, 2008, one page.

* cited by examiner

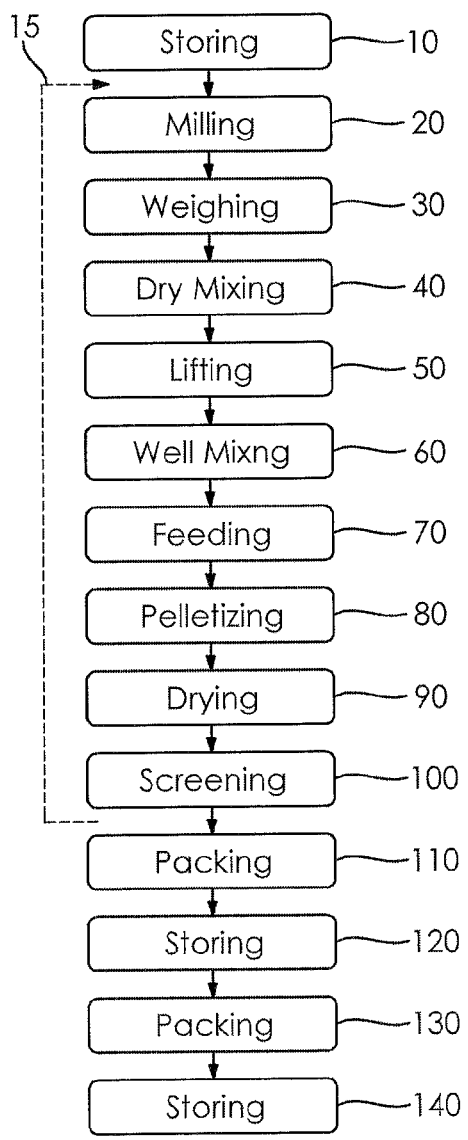

FOREHEARTH FRITS, PEARLS AND/OR CONCENTRATES FOR FLUORESCENCE

BACKGROUND OF THE INVENTION

1. Field of Invention

The present invention relates to the field of forehearth frits, pearls, and/or concentrates for use in glass compositions. In particular, the present invention provides a system of forehearth frits, pearls, and/or concentrates, in accordance with REACH and food migration specifications, that is capable of imparting a fluorescent effect to a glass product by addition to a glass composition in the forehearth of a glass furnace, and a method of using the fluorescent effect system of forehearth frits, pearls, and/or concentrates. The invention further provides a glass composition for use in forming the fluorescence system or for use directly in a forehearth.

2. Description of Related Art

Prior art shows that no method of imparting fluorescent effects to glass exists. Fluorescence is an effect usually used for paints, polymers such as polishes, or very technical items such as lasers or banknotes.

BRIEF SUMMARY OF THE INVENTION

Accordingly, methods to obtain fluorescent glasses via forehearth are sought. The present invention represents one such effort. Fluorescence is a light emission which follows an absorption of UV light or X-rays. Lasers can be used to provide the UV or X-ray irradiation. This emitted light is called luminescence and is visible only under exposure.

In the following the glass frit which contains element(s) able to produce fluorescence in glass will be named "the fluorescent glass frit" and the glass pearl or concentrate which contains element(s) able to produce fluorescence in glass will be named "fluorescent forehearth concentrate or pearl." Collectively, these will be termed "fluorescent dyes" or simply "dyes."

The manufacture of fluorescent glass in a forehearth of a furnace may be undertaken by the addition of either: (i) a fluorescence enriched glass frit, or (ii) a fluorescence-imparting concentrate or pearl comprising a non-smelted compacted interspersion for addition to the molten glass in the forehearth of a glass furnace. The concentrate or pearl is added to a molten clear, colorless or colored base glass. The intentional addition of fluorescence-imparting oxides, glasses, concentrates or pearls to a molten base glass in the forehearth of a glass furnace is believed to be novel. Fluorescence can be imparted to, and observed in, various glasses such as soda-lime glasses, borosilicate glasses or opal glasses. In such processes, the fluorescent glass frit or fluorescent forehearth concentrate or pearl is added to the molten glass flowing through the forehearth of a furnace. Unlike mass production, the fluorescence-imparting compositions and processes of the invention make possible the manufacture of one or more fluorescent effect compositions and clear/colorless/colored glass compositions from a single melting furnace equipped with multiple forehearths. In the forehearth fluorescence imparting process, the fluorescent glass frit or fluorescent forehearth concentrate or pearl is metered into the molten base glass after the base glass flows from the refining zone or distributor of the furnace and into the forehearth. It can be added in combination with one or several colored usual frits, pearls or concentrates. Indeed, a fluorescent effect can be observed in a colored glass.

The present invention provides a system of fluorescent forehearth frits, pearls and/or concentrates that can be quickly and completely dispersed and dissolved when added to the molten base glass of a forehearth furnace at conventional commercial molten glass temperatures. Accordingly, the system of frits, pearls and/or concentrates can be used at a lower loading (less than about 10 wt %, preferably less than 5 wt %, such as 0.1-5% or 1-4%) in the final glass composition relative to the prior art. Use of the forehearth fluorescent effect frits, pearls and/or concentrates of the present invention leads to a uniform dispersion of fluorescent glass with the base glass obtaining a fluorescent effect. With these fluorescence-imparting compositions, the glass producer can also produce other heterogeneous effect like fluorescent stripes. The invention further provides methods of using the glass frits, concentrates or pearls, and a method for forming an agglomerated fluorescent effect concentrate or pearl.

Broadly, the forehearth fluorescent system comprises one or several glass frits, pearls or concentrates that are free of at least one of nickel, chromium, lead and cadmium and preferably free of all of nickel, chromium, lead and cadmium. Certain rare-earth oxides may contain traces of nickel and/or chromium.

An embodiment of the invention is a fluorescent glass frit comprising at least glass-forming metal oxide like $SiO_2$ from about 15 to about 65% in weight, at least one metal, including but not limited to rare earth metals and/or their oxides from about 5 to about 65% in weight, selected from the group consisting of:
  europium compounds, such as europium oxide,
  terbium compounds, such as terbium oxide,
  dysprosium compounds, such as dysprosium oxide,
  gadolinium compounds, such as gadolinium oxide,
  samarium compounds, such as samarium oxide,
  thulium compounds, such as thulium oxide,
  cerium compounds, such as cerium oxide,
  or combinations of the foregoing or,
at least one metal oxide selected from the group consisting of:
  copper oxide,
  manganese oxide,
  tungsten oxide,
  or combinations of the foregoing.
Instead of oxides, it is possible to have certain elements in different forms such as sulfide or nitrate. The frit could also include other glass-forming oxides such as elements as $Na_2O$, $K_2O$, $Li_2O$, SrO, CaO, BaO, $Al_2O_3$, $TiO_2$, ZnO, $ZrO_2$, and others.

A method for imparting a fluorescent effect to a molten base glass in the forehearth of a glass furnace comprising the steps of:
  a. forming a fluorescence-imparting frit comprising:
    from about 10 to about 65 wt % of oxides selected from the group consisting of:
      europium compounds, such as europium oxide,
      terbium compounds, such as terbium oxide,
      dysprosium compounds, such as dysprosium oxide,
      gadolinium compounds, such as gadolinium oxide,
      samarium compounds, such as samarium oxide,
      thulium compounds, such as thulium oxide,
      cerium compounds, such as cerium oxide,
      or combinations of the foregoing or,
    or, at least one metal oxide selected from the group consisting of:
   copper oxide,
   manganese oxide,
   tungsten oxide,
   or combinations of the foregoing,
b. combining the fluorescence-imparting frit, pearl or concentrate, or mixture thereof, with the molten glass contained in a forehearth so as to impart a fluorescent effect to the molten glass; and
c. cooling the molten glass to form a fluorescent glass composition.

Fluorescence of the glass so formed is visible under UVA, that is to say, under a light emitted between 315 and 400 nm, or alternatively under laser light or cathodic rays depending on the oxide chosen and the emitted wavelength. Fluorescence colors also depend on the oxide chosen.

In another embodiment the invention provides a method of forming an agglomerated fluorescent forehearth pearl or concentrate for use in providing a fluorescent effect to a glass comprising a non-smelted interspersion of particles formed by the steps of: (i) providing from about 10 to about 65 wt % of oxides selected from the group consisting of:
   europium compounds, such as europium oxide,
   terbium compounds, such as terbium oxide,
   dysprosium compounds, such as dysprosium oxide,
   gadolinium compounds, such as gadolinium oxide,
   samarium compounds, such as samarium oxide,
   thulium compounds, such as thulium oxide,
   cerium compounds, such as cerium oxide,
   or combinations of the foregoing or,
   at least one metal oxide selected from the group consisting of:
   copper oxide,
   manganese oxide,
   tungsten oxide,
   or combinations of the foregoing,
(ii) providing a binder, (iii) optionally providing a base milled frit that is free of at least one of nickel, chromium, lead and cadmium and preferably free of all of nickel, chromium, lead and cadmium, (iv) optionally adding solvent or water, (v) thoroughly mixing the composition to form a mixture and (vi) agglomerating the mixture by pelletizing or compacting the mixture to form a color forehearth pearl or concentrate and (vii) optional drying at a temperature low enough so as not to sinter or fuse the mixture under 400° C. The optional base milled frit can be any frit or combination of frits. The present invention provides a color forehearth system to provide fluorescence to mass produced glasses. The frits, pearls and concentrates of the invention may be used separately or together at a total concentration of less than 10%, preferably less than 5% by weight relative to the weight of base glass.

Fluorescence dyes are relatively stable. Fluorescence can be observed at low or high furnace temperatures conditions; in oxidant, neutral or reducing conditions; and even without striking treatment. Some dyes made of rare earth oxides like gadolinium oxide gives fluorescence after annealing treatment, that is to say, after from about 15 to about 90 minutes, preferably from about 20 to about 80 minutes between about 500 and 650° C., preferably between about 525 and about 625° C.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 1 is a schematic depiction of the physical processing of an embodiment of the invention.

DETAILED DESCRIPTION OF THE INVENTION

In the manufacturing of color glasses, color or effect-imparting frits, pearls or concentrates can be added to a forehearth, which is situated between a furnace and an automatic forming machine. The object of the present invention is to add forehearth frits, pearls or concentrates to impart to glasses a fluorescent effect.

All compositional percentages herein are by weight and are given for a blend prior smelting for frits and prior to drying for pearls or concentrates. All percentages, temperatures, times, particle sizes and ranges of other values are presumed to be accompanied by the modifier "about." Details on each component and ingredient follow.

Fluorescent Glass Frits. The fluorescence-imparting frits of the invention provide fluorescence through the presence of a rare earth metal such as An embodiment of the invention is a fluorescent glass frit comprising at least glass-forming metal oxide like $SiO_2$ from about 15 to about 65% in weight, and at least one rare earth compounds, such as oxides, from about 5 to about 65% in weight, selected from the group consisting of:
   europium compounds, such as europium oxide,
   terbium compounds, such as terbium oxide,
   dysprosium compounds, such as dysprosium oxide,
   gadolinium compounds, such as gadolinium oxide,
   samarium compounds, such as samarium oxide,
   thulium compounds, such as thulium oxide,
   cerium compounds, such as cerium oxide,
   or combinations of the foregoing or,
at least one of the metal oxides selected from the group consisting of:
   copper oxide,
   manganese oxide,
   tungsten oxide,
   or combinations of the foregoing.
It is also possible to have certain elements present in compounds other than oxides such as sulfides or nitrates.

In the above embodiment, the at least one oxide metal or combinations may be present in a weight percent of the final glass batch of 0.01 to 6.5%.

Glass Compositions:
a) Soda-Lime Glass Composition Ranges

| % | Range1 | Range 2 | Range 3 |
|---|--------|---------|---------|
| $SiO_2$ | 63-73 | 63.1-69.9 | 69.9-72.8 |
| $Na_2O$ | 4.5-16.5 | 4.9-16.3 | 5.2-16.1 |
| CaO | 1-15 | 1.25-14.5 | 1.4-14.3 |
| $Al_2O_3$ | 0.1-5 | 0.2-4.8 | 0.3-4.6 |
| BaO | 0-9.5 | 1.7-9.2 | 1.79-9.13 |
| MgO | 0.01-3.5 | 0.01-3.45 | 1.1-3.42 |
| $K_2O$ | 0.01-9 | 0.02-8 | 1.06-7.99 |
| $B_2O_3$ | 0-17 | 0.8-14.9 | 0.81-14.81 |
| ZnO | 0-3 | 0.1-2.9 | 0.3-2.8 |
| $Sb_2O_3$ | 0-0.6 | 0.25-0.55 | 0.26-0.53 |
| $SO_3$ | 0.1-0.4 | 0.1-0.25 | 0.12-0.21 |
| $MnO_2$ | 0-0.25 | 0.05-0.2 | 0.07-0.17 |

-continued

| % | Range1 | Range 2 | Range 3 |
|---|---|---|---|
| Li2O | 0-0.35 | 0.05-0.3 | 0.07-0.27 |
| TiO2 | 0-0.3 | 0.05-0.25 | 0.06-0.21 |
| Fe2O3 | 0-0.25 | 0.05-0.2 | 0.06-0.17 |
| ZrO2 | 0-0.2 | 0.2-0.17 | 0.04-0.15 |
| SrO | 0-0.2 | 0.02-0.17 | 0.04-0.15 |
| CeO2 | 0-0.15 | 0.01-0.1 | 0.03-0.07 |
| P2O5 | 0-0.1 | 0.01-0.08 | 0.01-0.05 | b) Opal Glass Composition Ranges

| % | Range1 | Range 2 | Range 3 |
|---|---|---|---|
| SiO2 | 63-73 | 64-72 | 64.4-71.1 |
| Na2O | 10-19 | 11-18 | 11.1-17.75 |
| Al2O3 | 3.5-9.5 | 4.1-9 | 4.3-8.7 |
| CaO | 0.01-7 | 0.05-6.5 | 0.10-6.2 |
| ZnO | 0.03-4 | 0.05-3.7 | 0.07-3.5 |
| B2O3 | 0.01-3.5 | 0.03-3.25 | 0.04-3 |
| BaO | 0.01-3 | 0.03-2.75 | 0.05-2.5 |
| F— | 0-3.5 | 0.75-3.3 | 1-3.3 |
| MgO | 0-2.5 | 0.5-2.25 | 0.7-2.1 |
| K2O | 0-1.5 | 0.3-1.25 | 0.4-1.15 |
| CoO | 0-1.2 | 0.25-1 | 0.3-0.9 |
| Sb2O3 | 0-1.1 | 0.1-0.9 | 0.2-0.7 |
| TiO2 | 0.05-0.25 | 0.07-0.22 | 0.10-0.2 |
| Fe2O3 | 0.03-0.27 | 0.07-0.17 | 0.09-0.16 |
| ZrO2 | 0.03-0.26 | 0.07-0.17 | 0.09-0.15 |
| SrO | 0.03-0.57 | 0.07-0.2 | 0.08-0.17 |
| SO3 | 0-0.5 | 0.05-0.4 | 0.10-0.35 |
| Li2O | 0.01-0.25 | 0.02-0.2 | 0.05-0.15 |
| NiO | 0-0.15 | 0.3-0.11 | 0.05-0.09 | c) Boro-Silicate Glass Composition Ranges

| % | Range1 | Range 2 | Range 3 |
|---|---|---|---|
| SiO2 | 67-79 | 68.2-78.3 | 69.5-77.5 |
| B2O3 | 12-17 | 12.5-16 | 12.8-14.9 |
| Na2O | 4.5-6.5 | 4.9-5.9 | 5.2-5.7 |
| Al2O3 | 2.3-5.5 | 2.5-4.9 | 2.4.56 |
| BaO | 0.05-3.7 | 0.07-3.5 | 0.1-3.3 |
| CaO | 0.1-1.75 | 0.2-1.65 | 0.3-1.5 |
| K2O | 0.15-0.5 | 0.2-0.4 | 0.21-0.35 |
| Sb2O3 | 0-0.4 | 0.1-0.3 | 0.02-0.25 |
| TiO2 | 0-0.25 | 0.05-0.2 | 0.07-0.15 |
| MgO | 0-0.2 | 0.3-0.15 | 0.05-0.12 |
| Fe2O3 | 0-0.15 | 0.05-0.12 | 0.06-0.11 |
| V2O5 | 0-0.15 | 0.05-0.12 | 0.06-0.11 |
| MnO2 | 0-0.15 | 0.05-0.12 | 0.06-0.11 |
| ZnO | 0-0.15 | 0.05-0.12 | 0.06-0.11 |
| Li2O | 0-0.15 | 0.05-0.12 | 0.06-0.11 |
| CoO | 0-0.15 | 0.05-0.12 | 0.06-0.11 |
| ZrO2 | 0-0.15 | 0.05-0.12 | 0.06-0.11 |
| SnO2 | 0-0.1 | 0.02-0.09 | 0.03-0.08 |
| SrO | 0-0.1 | 0.02-0.09 | 0.03-0.08 |
| CuO | 0-0.1 | 0.02-0.09 | 0.03-0.08 |
| NiO | 0-0.1 | 0.02-0.09 | 0.03-0.08 |

Pearl and Frit Compositions:
a) Pearl Composition:

| $SiO_2$ | $B_2O_3$ | $Na_2O$ | CaO | RE |
|---|---|---|---|---|
| 15-65% | 0-5% | 5-30% | 0-5% | 5-65% |

RE = europium oxide, terbium oxide, dysprosium oxide, gadolinium oxide, samarium oxide, thulium oxide, cerium oxide, or combinations of the foregoing.

The pearl could also include other glass-forming oxides such as elements as $K_2O$, $Li_2O$, SrO, BaO, $Al_2O_3$, $TiO_2$, ZnO, $ZrO_2$, and others.

b) Frit Compositions:

| $SiO_2$ | $Al_2O_3$ | $B_2O_3$ | $Na_2O$ | CaO | RE | $Li_2O$ |
|---|---|---|---|---|---|---|
| 15-65% | 0-5% | 3-25% | 5-15% | 0-8% | 5-65% | 0-15% |

RE = europium oxide, terbium oxide, dysprosium oxide, gadolinium oxide, samarium oxide, thulium oxide, cerium oxide, or combinations of the foregoing.

The frit could also include other glass-forming oxides such as elements as $K_2O$, SrO, BaO, $TiO_2$, ZnO, $ZrO_2$, and others.

Or, the rare-earth containing frit may also have the composition:

| $SiO_2$ | $B_2O_3$ | $Na_2O$ | CaO | RE |
|---|---|---|---|---|
| 15-65% | 0-5% | 5-30% | 0-5% | 5-65% |

Rare earth oxides (as defined by RE above) may be used in the formulation in the table preceding this sentence. In addition to the value in the table, rare earth oxides may be present in the frit in amounts of 10-60 wt %, alternately 20-50 wt % or 25-45 wt % or amounts such as 30, 32, 35, 36, 37, 38, 39, 40, 41, 42, 43, 44, 45, 46, 48, 50, 51, 53, 55, 57, 59, 61, 63 wt % or values in between. The frit could also include other glass-forming oxides such as elements as $K_2O$, $Li_2O$, SrO, BaO, $Al_2O_3$, $TiO_2$, ZnO, $ZrO_2$, and others.

Method. A method of forming a fluorescent glass composition or article comprises:
 a. forming a fluorescence-imparting frit, concentrate or pearl according to any formulation disclosed herein,
 b. combining the fluorescent frit, pearl or concentrate with the molten glass contained in a forehearth so as to impart a fluorescent effect to the molten glass; and
 c. cooling the molten glass to form a fluorescent glass composition or article.

The frit or frits comprising the glass component can be formed by conventional methods. Preferably, selected oxides are smelted in a continuous, rotary or induction smelter and then the molten glass is converted to frit using water-cooled rollers or water quenching.

Binder. The binder used in the color forehearth pearls or concentrates according to the present invention can be any substance that is compatible with the base glass being colored and does not interfere with dispersion of the glass component. The binder is used at a rate of 5-70 wt % of the color systems disclosed herein, preferably 10-65 wt %. The binder helps hold the non-smelted agglomerated interspersion raw materials together until they are added to the base glass in the forehearth. Once the color forehearth pearls or concentrates have been added to the base glass being colored, the binder locally and temporarily reduces the fusion temperature between the glass component and the base glass for a time sufficient to permit a rapid and thorough dispersion of the color glass frit(s) through the base glass. The binder also disperses throughout the base glass and becomes diluted to the point that it does not alter the basic characteristics of the base glass.

Suitable binders for use in the invention comprise one or more materials selected from the group consisting of alkali borates, boric acid, alkali phosphates, orthophosphoric acid, alkali silicates, fluorosilicic acid, alkali fluorides, alkali salts, alkali hydroxides and mixtures. Suitable alkali cations include the alkali metals such as sodium, potassium and lithium and the alkaline earth metals such as calcium, magnesium and barium.

Suitable alkali borates that can be employed as binders in the invention include borax, potassium pentaborate, potassium metaborate, potassium tetraborate, and calcium borate. Among the alkali phosphates which can be employed are hemisodium phosphate, monosodium phosphate, disodium phosphate, trisodium phosphate, monopotassium phosphate, dipotassium phosphate, tripotassium phosphate, monoammonium phosphate, diammonium phosphate, monocalcium phosphate, dicalcium phosphate, tricalcium phosphate, sodium acid pyrophosphate, tetrasodium pyrophosphate, tetrapotassium pyrophosphate, calcium pyrophosphate, sodium tripolyphosphate, potassium tripolyphosphate, calcium tripolyphosphate, potassium metaphosphate, sodium trimetaphosphate, sodium monofluorophosphate, calcium monofluorophosphate and sodium tetrametaphosphate. Suitable alkali silicates include sodium silicate, potassium silicate, sodium fluorosilicate and calcium fluorosilicate. Suitable alkali fluorides include sodium aluminum fluoride, calcium fluoride, lithium fluoride, anhydrous potassium fluoride, potassium fluoride dihydrate, potassium bifluoride and sodium fluoride. Suitable alkali salts include sodium carbonate and barium carbonate. Suitable alkali hydroxides include sodium hydroxide, lithium hydroxide and potassium hydroxide.

The preferred binders however are the alkali silicates formed from alkali metals such as potassium, lithium and sodium. The alkali metal silicates are preferred because they are readily dispersed when added to base glasses in the forehearth. Of the alkali silicates, the silicate of sodium is most preferred.

Pearls or Concentrates. Color forehearth pearls or concentrates according to the invention comprise a non-smelted agglomerated interspersion of particles. In other words, the binder and other components are not fused or smelted together, but rather they are formed into an agglomerated interspersion of particles by physical compression or granulation (pelletization). The non-smelted agglomerated interspersion of particles, which are sometimes referred to as pearls or concentrates, are non-dusting, and easy to handle and meter into the base glass in the forehearth. The pearls or concentrate can be formed into any size, but are preferably small to reduce the amount of time necessary for them to disperse into the molten base glass. Pearls and concentrates generally having a size of about 1 mm to about 10 mm are preferred. Concentrates can be formed using conventional cold compaction equipment and methods. Pearls can be formed using conventional granulation (pelletization) equipment and processes.

The present invention also provides a method for providing a fluorescent effect to a molten base glass in a forehearth furnace. The method comprises the steps of: (i) providing at least one of fluorescent frits, pearls and concentrates according to the invention; (ii) adding at least one of the fluorescent frits, pearls and concentrates to a molten base glass in a forehearth so as to impart fluorescence to the molten base glass; and (iii) cooling the molten base glass to form a fluorescent glass composition. The fluorescent forehearth pearls or concentrates according to the invention are added as a particulate solid at a point in the forehearth other than in the base glass main melting tank. Ordinarily, the addition will most conveniently be made, on a continuous basis, to the pool of molten glass in the forehearth shortly after it issues from the main melting tank.

Where advantageous however, the method of this invention may be practiced as a batch process, with the fluorescent forehearth frits, pearls or concentrates being added to a melted base glass batch, or being added as a glass forming-providing a fluorescent effect to an ingredient to the normal glass forming batch composition prior to melting.

Distribution and dispersion of the fluorescent forehearth frits, pearls or concentrates according to the invention in the molten base glass may be accomplished by any suitable means, such as by introducing a stirring device into the pool of glass or by adding the fluorescent forehearth frits, pearls or concentrates while the base glass is being drawn and moved through a confined area such that flaw and slip within the glass produces a homogeneous mixture. The locus and manner of mixing will readily be selected by those skilled in the art and the particular method of addition will depend on the apparatus available.

The amount of fluorescent frits, pearls or concentrates to be added to the base glass will be determined by numerous parameters such as the quantum of molten base glass, its flow rate through the forehearth, the concentration of providing a fluorescent effect agents in the frits, pearls or concentrates, and the degree of providing a fluorescent effect desired in the final product. The proportions to be employed with any selected set of parameters can readily be ascertained by one having ordinary skill in the art of forehearth techniques. It is possible, by manipulating the concentration of fluorescent effect agents in the glass component and by manipulating the let-down ratio of the fluorescent forehearth frits, pearls or concentrates in the molten base glass, to produce a wide variety of desirable fluorescent glasses, in terms of intensity, color or effect like fluorescent stripes.

The following examples are intended only to illustrate the invention and should not be construed as imposing limitations upon the claims.

EXAMPLES

Example A

A fluorescence-imparting pearl, is made of:
39.1% of $Dy_2O_3$
40.9% of $SiO_2$
1.6% of $B_2O_3$
17.8% of $Na_2O$
and 0.6% of CaO This pearl is introduced at 2% in a silica-soda-lime glass batch, smelting at a temperature of about 1250° C., under reducing conditions. Thus, the final glass will be composed of about 39.1%×2%=7820 ppm of dysprosium oxide and will produce a yellow fluorescence under UVA which is a feature of dysprosium.

Example B

Two pearls, the first one containing:
42.1% of $Sm_2O_3$
39.9% of $SiO_2$
1.0% of $B_2O_3$
15.8% of $Na_2O$
and 1.2% of CaO:
and the second containing:
10% of $CeO_2$
58.5% of $SiO_2$
3.1% of $B_2O_3$
25.2% of $Na_2O$
and 3.2% of CaO are introduced at 3% of feed rate for the samarium pearl and at 0.5% for the cerium pearl in borosilicate glass batch, smelting at a temperature of about 1450° C., under oxidizing conditions. The final glass will produce a pink/violet fluorescence under UVA or laser light.

Example C

One pearl which contains:
25% of terbium oxide,
10% of cerium oxide
8% of selenium oxide
39.9% of $SiO_2$
0.8% of $B_2O_3$
15.2% of $Na_2O$
and 1.1% of CaO
is introduced at 3% in a silica-soda-lime glass batch, smelting at a temperature of about 1300° C., under reducing conditions, gives a light pink glass with a greenish white fluorescence under UVA or laser light.

Example D

One frit which contains:
25% of $Eu_2O_3$
55% of $SiO_2$
15% $Na_2O$
5% $B_2O_3$
is introduced at 3% in a silica-soda-lime glass batch, smelting at a temperature of about 1250° C., under oxidant conditions, gives a pink fluorescence under UVA or laser light.

The pearl is manufactured adding raw materials, binder and water, pelletizing and drying as shown in FIG. 1. Raw materials are transferred from storage 10 to mills 20. Previously produced out of specification product 15 is added to the process flow between the storage 10 and mills 20. Ball milling of raw materials such as sodium silicate and is undertaken. The milled materials are weighed at weighing station 30. The weighed batch is dry mixed 40 and lifted 50 into a wet mixer 60. From the wet mixer 60, the intermediate product is fed 70 into a pelletizer 80. The pelletized product is then dried 90 then screened 100 before packing 110 into bags. The bagged/packaged product may be further stored 120 and repackaged 130 into boxes before final storage 140 as a final product.

The invention is further described with respect to the following items.

Item 1. A fluorescent glass frit comprising at least one glass-forming metal oxide and at least one metal selected from the group consisting of
europium,
samarium,
dysprosium,
copper and tin,
terbium,
cerium,
dysprosium and cerium,
samarium and cerium, and
combinations of the foregoing and
is devoid of at least one of nickel, chromium, lead and cadmium.

Item 2. The fluorescent glass frit of item 1, wherein the at least one metal is present in the glass frit in an amount of about 0.1 to about 5 wt %.

Item 3. The fluorescent glass frit of item 1 or 2, wherein the at least one metal is present in a weight percent and/or weight ratio selected from the group consisting of
2-4% europium,
1-3% samarium,
1-5% dysprosium,
2-7% (copper+tin) in a weight ratio from 1.5:1 to 1:1.5,
2-4% terbium,
0.5-2% cerium,
2-5% (dysprosium+cerium) in a weight ratio of 4:1 to 2:1,
1-4% (samarium+cerium) in a weight ratio of 15:1 to 1.5:1, and
combinations of the foregoing.

Item 4. A fluorescent glass frit comprising in weight %:
from about 30 to about 50% of a metal other than silicon, boron, alkalis, beryllium, magnesium, strontium, barium and radium, beryllium, magnesium, strontium, barium and radium nickel, chromium, lead and cadmium,
from about 25 to about 55% $SiO_2$,
from about 0.1 to about 5% $B_2O_3$,
from about 10 to about 25% $Na_2O$,
from about 0.1 to about 3% CaO,
no nickel, no chromium, no lead and no cadmium.

Item 5. The fluorescent glass frit of item 4, comprising in weight %: from about 32 to about 47% of a metal other than silicon, boron, alkalis, beryllium, magnesium, strontium, barium and radium, nickel, chromium, lead and cadmium,
from about 31 to about 49% $SiO_2$,
from about 0.2 to about 3% $B_2O_3$,
from about 12 to about 22% $Na_2O$,
from about 0.2 to about 2% CaO,
no nickel, no chromium, no lead and no cadmium.

Item 6. The fluorescent glass frit of item 1, comprising in weight %: from about 34 to about 46% of a metal other than silicon, boron, alkalis, beryllium, magnesium, strontium, barium and radium, nickel, chromium, lead and cadmium,
from about 35 to about 44% $SiO_2$,
from about 0.2 to about 2.5% $B_2O_3$,
from about 13 to about 20.5% $Na_2O$,
from about 0.2 to about 1.5% CaO,
no nickel, no chromium, no lead and no cadmium.

Item 7. The fluorescent glass frit of any of items 4-6 wherein the metal is a rare earth metal selected from the group consisting of Eu, Tb, Dy, Gd, Sm, Tm, Ce and combinations thereof.

Item 8. The fluorescent glass frit of any of items 4-6, wherein the metal oxide is at least one of a metal selected from the group consisting of copper, tin, manganese, yttrium, zinc and tungsten.

Item 9. The fluorescent glass frit of any of items 4-6, wherein the metal oxide is an oxide of a metal selected from the group consisting of copper/tin, and yttrium/manganese.

Item 10. The fluorescent glass frit of any of items 1-9, wherein the color glass frit is devoid of heavy metals.

Item 11. The fluorescent glass frit of item 10, wherein the heavy metals are selected from the group consisting of Sc, Ti, V, Cr, Fe, Co, Ni, Zr, Nb, Mo, Tc, Ru, Rh, Pd, Ag, Cd, Hf, Ta, Re, Os, Pt, Au, Hg, Tl, Pb, Bi and combinations thereof.

Item 12. A soda-lime glass further comprising the fluorescent glass frit of any of items 1-11.

Item 13. A borosilicate glass further comprising the fluorescent glass frit of any of items 1-11.

Item 14. An opalescent glass further comprising the fluorescent glass frit of any of items 1-11.

Item 15. A pearl or concentrate comprising the fluorescent glass frit of any of items 1-11.

Item 16. The glass frit, pearl or concentrate of any of items 1-15 wherein the glass frit, pearl or concentrate is devoid of all of nickel, chromium, lead and cadmium.

Item 17. A method for imparting a fluorescent effect to a molten base glass in the forehearth of a glass furnace comprising the steps of:
a. forming a fluorescent frit comprising:
from about 30 to about 50 wt % of a metal other than silicon, boron, alkalis, beryllium, magnesium, strontium, barium and radium, nickel, chromium, lead and cadmium,
from about 25 to about 55% $SiO_2$,
from about 0.1 to about 5% $B_2O_3$,
from about 10 to about 25% $Na_2O$,
from about 0.1 to about 3% CaO,
no nickel, no chromium, no lead and no cadmium;
b. combining the fluorescent frit with the molten glass contained in a forehearth so as to impart a fluorescent effect to the molten glass; and
c. cooling the molten glass to form a fluorescent glass composition.

Item 18. The method of item 16, wherein the fluorescent frit comprises in weight %
from about 32 to about 47% of a metal other than silicon, boron, alkalis, beryllium, magnesium, strontium, barium and radium, nickel, chromium, lead and cadmium,
from about 31 to about 49% $SiO_2$,
from about 0.2 to about 3% $B_2O_3$,
from about 12 to about 22% $Na_2O$,
from about 0.2 to about 2% CaO,
no nickel and
no chromium.

Item 19. The method of item 16, wherein the fluorescent frit comprises in weight %:
from about 34 to about 46% of a metal other than silicon, boron, alkalis, beryllium, magnesium, strontium, barium and radium, nickel, chromium, lead and cadmium,
from about 35 to about 44% $SiO_2$,
from about 0.2 to about 2.5% $B_2O_3$,
from about 13 to about 20.5% $Na_2O$,
from about 0.2 to about 1.5% CaO,
no nickel and
no chromium.

Item 20. The method of item any of items 16-18, wherein the fluorescent frit is combined with the molten glass contained in a forehearth ata rate of 0.1-5% by weight.

Item 21. The method of item any of items 16-18, wherein the fluorescent frit is combined with the molten glass contained in a forehearth at a rate of 1-4% by weight.

Additional advantages and modifications will readily occur to those skilled in the art. Therefore, the invention in its broader aspects is not limited to the specific details and illustrative example shown and described herein.

The invention claimed is:
1. A method for imparting a fluorescent effect to a molten base glass in the forehearth of a glass furnace, the method comprising the step of:
a. forming a fluorescent frit, pearl, or concentrate comprising:
from about 32 to about 47 wt % of a metal compound other than compounds including silicon, boron, alkalis, beryllium, magnesium, strontium, barium and radium, nickel, chromium, lead and cadmium,
from about 31 to about 49 wt % $SiO_2$,
from about 0.2 to about 3 wt % $B_2O_3$,
from about 12 to about 22 wt % $Na_2O$,
from about 0.2 to about 2 wt % CaO,
no nickel, no chromium, no lead and no cadmium
b. combining the fluorescent frit, pearl, or concentrate with the molten base glass contained in a forehearth so as to impart a fluorescent effect to the molten base glass; and
c. cooling the molten base glass to form a fluorescent glass composition.

2. A soda-lime glass prepared by a method of claim 1.
3. A borosilicate glass prepared by a method of claim 1.
4. An opalescent glass prepared by a method of claim 1.
5. The method of claim 1, wherein the fluorescent frit, pearl, or concentrate comprises:
from about 34 to about 46 wt % of a metal compound other than compounds including silicon, boron, alkalis, beryllium, magnesium, strontium, barium and radium, nickel, chromium, lead and cadmium,
from about 35 to about 44 wt % $SiO_2$,
from about 0.2 to about 2.5 wt % $B_2O_3$,
from about 13 to about 20.5 wt % $Na_2O$,
from about 0.2 to about 1.5 wt % CaO.

6. The method of claim 1, wherein the fluorescent frit, pearl, or concentrate is combined with the molten base glass contained in the forehearth at a rate of 0.1-5% by weight.

7. A method for imparting a fluorescent effect to a molten base glass in the forehearth of a glass furnace comprising the steps of:
a. forming a fluorescent glass frit, pearl, or concentrate, which comprises:
from about 10-36 wt % of rare earth oxide selected from the group consisting of europium oxide, terbium oxide, dysprosium oxide, gadolinium oxide, samarium oxide, thulium oxide, or combinations of thereof, and
from about 15-65 wt % $SiO_2$;
from about 0-15 wt % $Li_2O$;
from about 0-5 wt % $Al_2O_3$;
from about 3-25 wt % $B_2O_3$;
from about 5-15 wt % $Na_2O$; and
from about 0-8 wt % CaO;
b. combining the fluorescent frit, pearl, or concentrate with the molten base glass contained in a forehearth so as to impart a fluorescent effect to the molten base glass; and
c. cooling the molten base glass to form a fluorescent glass composition,
wherein the fluorescent glass frit, pearl, or concentrate is devoid of nickel, chromium, lead and cadmium.

8. The method of claim 7, comprising:
from about 10-35 wt % of rare earth oxide selected from the group consisting of europium oxide, terbium oxide, dysprosium oxide, gadolinium oxide, samarium oxide, thulium oxide, or combinations of thereof.

9. The method of claim 7, comprising:
from about 10-30 wt % of rare earth oxide selected from the group consisting of europium oxide, terbium oxide, dysprosium oxide, gadolinium oxide, samarium oxide, thulium oxide, or combinations of thereof.

10. The method of claim 7, wherein the fluorescent frit, pearl, or concentrate is combined with the molten base glass contained in the forehearth at a rate of 0.1-5% by weight.

11. A soda-lime glass prepared by a method of claim 7.
12. A borosilicate glass prepared by a method of claim 7.
13. An opalescent glass prepared by a method of claim 7.
14. The method of claim 7, wherein the rare earth oxide comprises terbium oxide.

* * * * *